UNITED STATES PATENT OFFICE.

OSCAR DRESSEL, OF ELBERFELD, AND RICHARD KOTHE, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

BLUISH-BLACK AZO DYE.

No. 859,930.     Specification of Letters Patent.     Patented July 16, 1907.

Application filed April 20, 1907. Serial No. 369,341.

*To all whom it may concern:*

Be it known that we, OSCAR DRESSEL and RICHARD KOTHE, doctors of philosophy, chemists, citizens of the German Empire, residing at, respectively, Elberfeld and Vohwinkel, near Elberfeld, in the Kingdom of Prussia, German Empire, have invented new and useful Improvements in Bluish-Black Azo Dyes, of which the following is a specification.

Our invention relates to the manufacture and production of new bluish-black azo dyestuffs containing once or several times the glycin radical $$-NH-CH_2-COOH.$$

The process for their production consists in combining the tetrazo compound of the dyestuff: para-aminobenzene-azo-2-amino-5-naphthol-7-sulfonic acid either with two molecules of an azo dyestuff component containing the glycin radical ($-NH-CH_2-COOH$) or with one molecule of such a compound and one molecule of any other azo dyestuff component, or vice versa, or in converting into the monodiazo compound the dis azo dyestuff

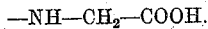

para-phenylene$\big\langle$ azo-2-amino-5-naphthol-7-sulfonic acid
<br>azo-X (X meaning an azo dyestuff component which may or may not contain the glycin radical) and combining the diazo compound thus obtained either with an azo dyestuff component containing the glycin radical or, if X already contains this radical, with any azo dyestuff component.

In order to carry out this process one can *e. g.* proceed as follows. The tetrazo compound of para-aminobenzene-azo-2-amino-5-naphthol-7-sulfonic acid is combined either with two molecules of meta-aminophenylglycin

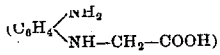

$(C_6H_4\langle{}^{NH_2}_{NH-CH_2-COOH})$ or with two molecules of meta-aminotolylglycin

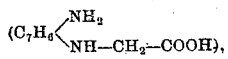

$(C_7H_6\langle{}^{NH_2}_{NH-CH_2-COOH})$, or with one molecule of one of these compounds and one molecule of meta-phenylenediamin or meta-toluylenediamin, or vice versa.

Analogous coloring matters are obtained if in the preceding example phenylenediamin or meta-toluylenediamin are replaced by another azo dyestuff component, such as, 2-amino-8-naphthol-6-sulfonic acid γ 2-amino-5-naphthol-7-sulfonic acid, 1-6- or 1-7-naphthylamin sulfonic acid, substitution products of these compounds, naphthol sulfonic acids, resorcinol, aminophenols, etc. etc.

Dyestuffs of analogous dyeing properties can also be obtained on carrying out the combination of the above components in any other order of succession *e. g.* on combining the diazo compound of para-aminobenzene-1.6-naphthylamin sulfonic acid with one molecule of 2-amino-5-naphthol-7-sulfonic acid, diazotizing the coloring matter with one molecule of nitrite and combining the diazo compound with meta-aminophenylglycin or meta-aminotolylglycin etc. etc.

Instead of meta-aminophenylglycin or meta-aminotolylglycin other suitable compounds containing the glycin radical can be employed, such as, glycins of amino-naphthol-sulfonic acids, naphthylamin sulfonic acids, or the like.

The new dyestuffs are dark powders easily soluble in water and dye full bluish-black shades. Their great affinity for the vegetable fiber permits an important simplification in the dyeing of half-woolen goods as it is possible to dye the cotton fiber of such fabrics during the milling process full shades, the wool being scarcely tinged at all. Upon reduction with stannous chlorid and hydrochloric acid the new dyestuffs are decomposed paraphenylenediamin and 2.6-diamino-5-naphthol-7-sulfonic acid being two of the products which are formed.

In order to carry out the new process we can proceed as follows, the parts being by weight: 15 parts of acetyl-para-phenylenediamin are diazotized in the usual manner and the resulting diazo compound is introduced into a solution of 24 parts of 2-amino-5-naphthol-7-sulfonic acid containing an excess of sodium carbonate. From the resulting azo dyestuff the acetyl group is eliminated in the usual way by boiling with caustic soda lye. The monoazo dyestuff thus produced having the formula:

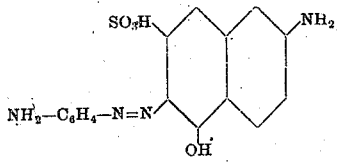

is then tetrazotized by means of 14 parts of sodium nitrite and the necessary quantity of HCl and the tetrazo-compound thus prepared is mixed with an aqueous solution of 16.6 parts of meta-aminophenylglycin. Sodium acetate is added to neutralize the free mineral acid. The intermediate compound which forms at once is mixed with 33 parts of 2-paratolylamino-5-naphthol-7-sulfonic acid dissolved in water containing an excess of sodium carbonate. The mixture is stirred for several hours, the dyestuff is (if necessary salted out), filtered off and dried. It dyes cotton deep blue-black.

In the following table the shades of some of the new dyestuffs are given:

| Dyestuff obtained from: 1 mol. para-phenyl-enediamin + 1 mol. 2-amino-5-naphthol-7-sulfonic acid (tetrazotized) + | Dyes cotton |
|---|---|
| 1) 2 mol. meta-aminophenylglycin | Blue-black. |
| 2) 2 mol. meta-aminotolylglycin | Blue-black. |
| 3) 1 mol. meta-aminophenylglycin + 1 mol. meta-phenylenediamin, | Blue-black. |
| 4) 1 mol. meta-toluylenediamin + 1 mol. meta-aminotolylglycin, | Blue-black. |
| 5) 1 mol. meta-aminophenylglycin + 1 mol. 1-acetylamino-2.4-diaminobenzene, | Blue-black. |
| 6) 1 mol. meta-aminophenylglycin + 1 mol. meta-aminophenol, | Blue-black with a violet cast. |
| 7) 1 mol. meta-aminophenylglycin + 1 mol. resorcinol, | Greenish blue-black. |
| 8) 1 mol. meta aminophenylglycin + 1 mol. 1-naphthylamin-6-sulfonic acid, | Greenish blue-black. |
| 9) 1 mol. 1-naphthylamin-6-sulfonic acid + 1 mol. meta-aminotolylglycin, | Blue-black. |
| 10) 1 mol. glycin of the 1-naphthylamin-6-sulfonic acid + 1 mol. meta-phenylenediamin, | Greenish blue-black. |
| 11) 1 mol. meta-aminophenylglycin + 1 mol. 1-naphthylamin-7-sulfonic acid, | Blue-black. |
| 12) 1 mol. meta-toluylenediamin + 1 mol. glycin of the 1-naphthylamin-7-sulfonic acid, | Blue-black. |
| 13) 1 mol. meta-aminophenylglycin + 1 mol. 1-naphthol-5-sulfonic acid, | Greenish blue-black. |
| 14) 1 mol. meta aminophenylglycin + 1 mol. 2-amino-5-naphthol-7-sulfonic acid, | Blue-black with a violet cast. |
| 15) 1 mol. meta-aminophenylglycin + 1 mol. 2-ethylamino-5-naphthol-7-sulfonic acid, | Blue-black with a violet cast. |
| 16) 1 mol. meta-aminophenylglycin + 1 mol. 2-diethylamino-5-naphthol-7-sulfonic acid, | Blue-black. |
| 17) 1 mol. meta-phenylenediamin + 1 mol. glycin of the 2-amino-5-naphthol-7-sulfonic acid, | Blue-black. |
| 18) 1 mol. meta-aminophenylglycin + 1 mol. 2-phenylamino-5-naphthol-7-sulfonic acid, | Blue-black with a violet cast. |
| 19) 1 mol. meta-aminophenylglycin + 1 mol. 2-paratolylamino-5-naphthol-7-sulfonic acid, | Blue-black. |
| 20) 1 mol. meta-aminotolylglycin + 1 mol. 2-amino-8-naphthol-6-sulfonic acid, | Greenish blue-black. |
| 21) 1 mol. meta-phenylenediamin + 1 mol. glycin of the 2-amino-8-naphthol-6-sulfonic acid, | Blue-black. |
| Dyestuff obtained from: 1 mol. para-phenyl-enediamin + 1 mol. 2-amino-5-naphthol-7-sulfonic acid (tetrazotized) + | Dyes cotton |
| 22) 1 mol. meta-aminophenylglycin + 1 mol. 2-phenylamino-8-naphthol-6-sulfonic acid, Dyestuff obtained from: | Blue-black. |
| 23) 1 mol. acetyl-para-phenylenediamin + 1 mol. 1-naphthylamin-6-sulfonic acid (the acetyl group being split off) + 1 mol. 2-amino-5-naphthol-7-sulfonic acid + 1 mol. meta-aminophenylglycin, | Blue-black. |
| 24) 1 mol. acetyl-para-phenylenediamin + 1 mol. 1-naphthylamin-6-sulfonic acid (the acetyl group being split off) + 1 mol. 2-amino-5-naphthol-7-sulfonic acid + 1 mol. meta-aminotolylglycin. | Blue-black with a violet cast. |

Having now particularly described our invention and in what manner the same is to be performed, what we claim as new, and desire to secure by Letters Patent, is:—

The herein-described azo dyestuffs characterized by the glycin radical —NH—CH$_2$—COOH, which dyestuffs can be obtained by combining the tetrazo compound of the dyestuff: para-aminobenzene-azo-2-amino-5-naphthol-7-sulfonic acid with two molecules of azo dyestuff components, of which at least one must contain the glycin radical, which dyestuffs are in the shape of their alkaline salts dark powders easily soluble in water; dyeing unmordanted cotton bluish-black shades and being decomposed by reduction with stannous chlorid and hydrochloric acid, paraphenylenediamin and 2.6-diamino-5-naphthol-7-sulfonic acid being two of the products which are formed, substantially as described.

In testimony whereof we have hereunto set our hands in the presence of two subscribing witnesses.

OSCAR DRESSEL. [L. S.]
RICHARD KOTHE. [L. S.]

Witnesses:
 OTTO KÖNIG,
 J. A. RITTERSHAUS.